Aug. 1, 1961
T. H. HAKALA ET AL
2,994,720
SOLVENT EXTRACTION OF DIISOPROPYL ETHER
FROM PROPYLENE SULFURIC ACID EXTRACTS
Filed Sept. 1, 1955
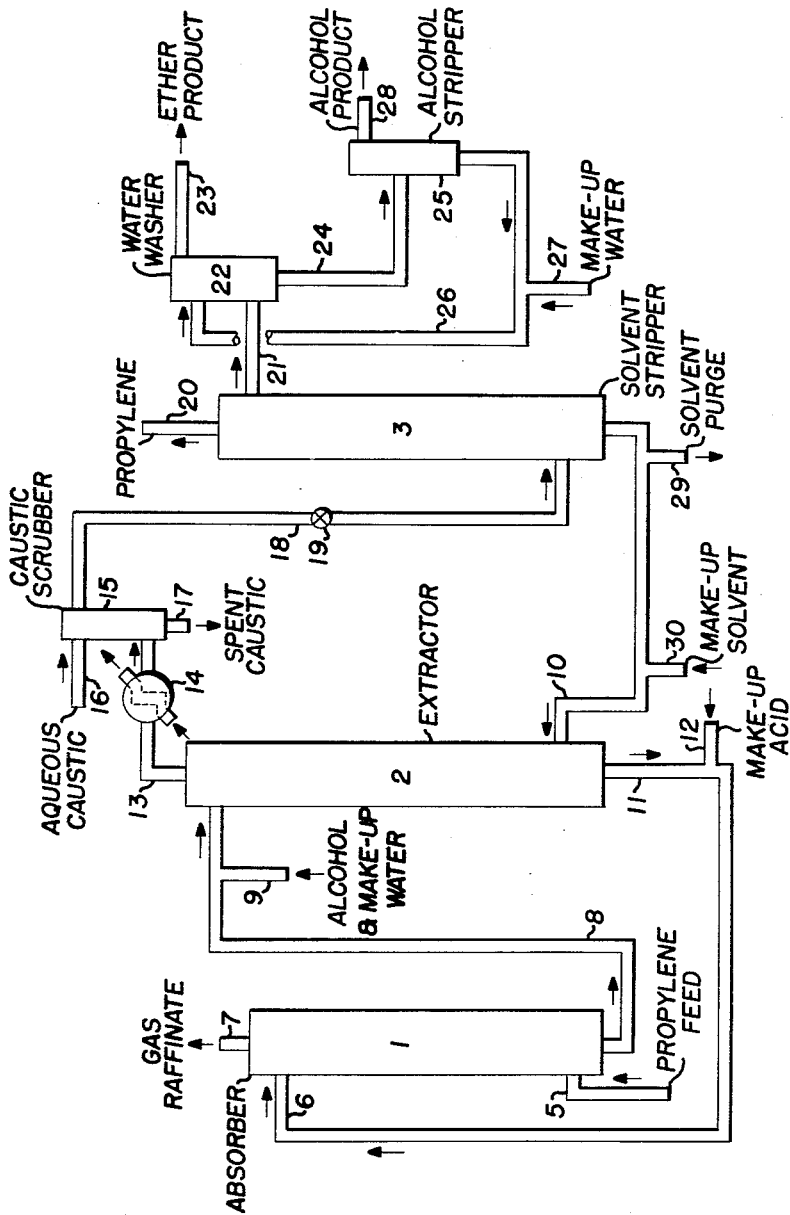
Thomas H. Hakala
Addison W. Hubbard
Walter R. F. Guyer
Fred W. Banes
Inventors
By *Henry Berl*  Attorney

2,994,720
SOLVENT EXTRACTION OF DIISOPROPYL ETHER FROM PROPYLENE SULFURIC ACID EXTRACTS

Thomas H. Hakala, Union, Addison W. Hubbard, Cranford, Walter R. F. Guyer, Short Hills, and Fred W. Banes, Westfield, N.J., assignors to Esso Research and Engineering Company, a corporation of Delaware
Filed Sept. 1, 1955, Ser. No. 532,063
5 Claims. (Cl. 260—614)

The present invention relates to a process for the manufacture of diisopropyl ether. More particularly, this invention is directed to a method of extracting diisopropyl ether from acid-olefin reaction products.

According to the present invention, maximum yields of ether are obtained with minimum yields of alcohol by operating at select operating conditions.

In brief compass, the process of this invention comprises admixing in an extraction zone an ether selective hydrocarbon solvent with an acid-propylene reaction product. The acid-propylene reaction product is prepared in a prior step by absorbing propylene in a conventional absorption zone in a strong inorganic liquid acid such as sulfuric acid. An extract containing the solvent and ether is then separated from the admixture in the extraction zone leaving acid lean in propylene. The acid is returned to the absorption zone for enrichment of propylene content. Diisopropyl ether is recovered from the extract, leaving the solvent and the solvent is returned to the extraction zone to repeat the cycle.

The extraction zone comprises a tower filled with packing or plates wherein descending acid extract is countercurrently contacted with upflowing solvent. This contacting may also be done with a series of mixer-settler type extration units with the acid propylene reaction product flowing countercurrent to the solvent. Pressures in the range of 20 to 200 p.s.i. are preferably used during the extraction to balance the propylene vapor pressure of the system and thus prevent propylene regeneration.

It is known in the art to manufacture diisopropyl ether by absorbing propylene in sulfuric acid of about 65 to 70 wt. percent $H_2SO_4$, on a hydrocarbon free basis, at a temperature of 70 to 90° C. and a pressure in the range of 75–500 p.s.i. The acid-olefin reaction product so obtained contains usually about 0.8 to 2.0 moles of propylene/mole of 100% acid. The reaction product may be heat treated or heat soaked at a temperature in the range of 195 to 240° F. before recovering the ether. The acid-olefin product is then sent to a separate ether recovery zone and stripped or fractionated to recover the ether substantially completely or partially. Water may be added prior to or after heat soaking the acid-olefin product to hydrolyze the sulfate ester present.

According to the present invention, an ether selective hydrocarbon solvent is mixed with the acid-propylene reaction product during the heat soaking step such that ether is removed from the acid-propylene reaction product as it is formed. The presence of the solvent favorably influences the equilibrium reaction causing it to form more ether whereby high conversions and good selectivities are obtained, and substantially increases the reaction rate. The system is maintained at a pressure sufficient to prevent regeneration of propylene, e.g. at or above the vapor pressure of the system at the operating temperature.

In its more specific aspects, this invention proposes a continuous diisopropyl ether manufacturing process which comprises the steps of countercurrently contacting 0.5 to 3 vols. of an ether selective hydrocarbon solvent, e.g. mixed xylenes, in an extraction zone with 1 vol. of an acid-olefin reaction product at a temperature in the range of 160 to 230° F., a pressure in the range of 20 to 200 p.s.i., and a holding time of 30 to 240 min., the reaction product initially containing 1.0 to 2.0 moles absorbed propylene per mole of 100% $H_2SO_4$ and being prepared by absorbing propylene in an absorption zone in sulfuric acid having an acid strength in the range of 60 to 70 wt. percent on a hydrocarbon free basis, withdrawing overhead from the extraction zone an extract containing at least 3 wt. percent ether, withdrawing from the lower portion of the extraction zone lean acid, returning the lean acid to the absorption zone to regenerate acid-olefin reaction product, separating the extract at a pressure in the range of 0 to 100 p.s.i.g. and a temperature in the range of 175 to 400° F., to recover diisopropyl ether, alcohol and solvent, and returning the solvent to the extraction zone to repeat the process.

The following description of the drawing attached to and forming a part of this specification will serve to make the present invention clear. The drawing schematically depicts one method of carrying out the teachings of the invention. For convenience, the operating conditions applicable to the description of this drawing are summarized in Table I, presented hereinafter.

Shown in the drawing are an absorption tower 1, an extraction tower 2, and a solvent stripping tower 3. While the method of generating the acid-olefin reaction product forms no part of this invention, the following description of absorber 1 will serve to illustrate one method of preparing a suitable acid-olefin product.

Absorber 1 comprises a vertically elongated tower which may be filled with packing such as Raschig rings, baffles or plates. The tower may be operated at atmospheric pressure but is preferably operated at pressures in the range of 100 to 1000 p.s.i. to favor propylene absorption. A propylene containing gas is admitted to the base of tower 1 by line 5. This gas contains preferably at least 40 volume percent propylene and has been treated to remove impurities although it may contain some higher molecular weight unsaturates. A strong inorganic liquid acid e.g., sulfuric acid, is admitted to the upper portion of the tower by line 6 and flows downwardly through the tower countercurrent to the propylene. When sulfuric acid is used it is preferred to use an acid strength in the range of 65 to 70 weight percent on a hydrocarbon free basis at a temperature in the range of 160 to 230° F. Normally 0.8 to 2.0 moles of 100% acid are used per mole of 100% propylene gas admitted to the tower by line 5. A gas raffinate is vented from the top of the tower by line 7. This gas may be suitably concentrated and recycled to the tower if desired. An acid-olefin product containing about 1 to 2 moles of absorbed propylene per mole of acid is withdrawn from the base of the tower by line 8 and transferred to extraction tower 2. Make-up water to maintain the acid strength can be admitted to line 8 by line 9. Recycled alcohol may also be admitted to line 8 by line 9 to increase ether selectivity and to maintain water balance.

Tower 2 may again comprise a vertically elongated zone filled with packing or plates that provide efficient countercurrent contacting between the acid-olefin product and solvent. A hydrocarbon solvent is admitted to the base of tower 2 by line 10 and passes upwardly therethrough countercurrent to the acid-olefin product. Acid lean in propylene is withdrawn from the base of the tower by line 11 and returned to absorption zone 1. Make-up acid may be added to line 11 by line 12 as needed. This lean acid normally contains less than 1.2 mols of propylene per mole of acid. An ether-solvent extract containing more than 3 wt. percent ether is recovered overhead from tower 2 by line 13.

The ether extract in line 13 may be cooled in heat exchanger 14 as necessary and then is passed through an acid removal system such as an aqueous caustic scrubber 15, caustic being supplied by line 16 and spent caustic being removed by line 17. The traces of acidic compounds may also be removed from the ether extract by ion exchange resins, clays, etc. The deacidified ether extract is then passed by line 18 to a solvent recovery system. As the extraction zone is operated under pressure in the preferred process, the ether extract may be reduced in pressure through valve 19 before being sent to the solvent recovery zone. This reduction in pressure may, if desired, be carried out in a separate unit to effect some stripping prior to introduction of the ether extract into the solvent recovery system.

This solvent recovery zone may be of any conventional type and may comprise more than one stage. As illustrated, a solvent stripping system is used although fractionation may well be used. The ether extract is introduced into a solvent stripping tower 3 operated at atmospheric or superatmospheric pressure. A stripping gas such as steam, flue gas or nitrogen, but preferably propylene, may be introduced into the tower.

Propylene from the solvent is recovered overhead from tower 3 via line 20. This gas may be recycled to the absorption zone or may first be sent through suitable concentration equipment and then recycled to the absorption zone. The desired diisopropyl ether is recovered from the upper portion of the tower via line 21. In this recovery process the ether rich product is water washed in vessel 22 to extract the alcohol. The washed ether is removed via line 23 and may be further treated as desired. Aqueous isopropyl alcohol, also produced during the reaction, is removed via line 24. This mixture may be concentrated by azeotropic distillation or stripping in tower 25. The water removed is recycled via line 26 to washer 22, make-up water being added by line 27. The alcohol can be removed as product via line 28 but more preferably, is recycled via line 9 to the extraction zone to favor the production of ether.

Solvent containing less than 0.5 wt. percent ether is removed from the base of tower 3 and recycled via line 10 to extractor 2. Make-up solvent as needed may be supplied to line 10 via line 30. The recycled solvent normally contains small amounts of ether, alcohol and water.

Under the action of the sulfuric acid, some high boiling side reaction products may be formed, e.g., propylene trimers and tetramers. These may be returned with the recovered solvent in line 10, or a portion of the recycled solvent may be purged from the system via line 29. Solvent can be recovered from this purge stream in a separate unit for recycle.

The system is kept in water balance by the addition of water per se, as to the acid phase, to the feed or to make-up solvent. Water is also added to the alcohol azeotrope via line 27. Alternatively, or in combination with the addition of water, extraneous isopropyl alcohol may be admitted to the system as by line 9 to maintain the water balance.

Table I summarizes the operating conditions applicable to the above-described apparatus and presents a specific example thereof using as a solvent mixed xylenes. The table does not concern itself with the preparation of the acid-olefin reaction product as this preparation forms no part of the present invention.

TABLE I

|  | Preferred Range | Example |
|---|---|---|
| Operating Conditions: | | |
| Extractor— | | |
| Pressure, p.s.i.g | 20 to 200 | 30 |
| Temperature, °F | 195 to 230 | 212 |
| Acid-olefin product feed rate, vol./hr./free reactor vol | 0.25 to 2 | .75 |
| Solvent feed rate vol./vol. acid-olefin product | 0.5 to 3 | 2 |
| Acid-olefin product holding time, mins. | 30 to 200 | 180 |
| Stripper— | | |
| Pressure, p.s.i.g | 0 to 100 | 0 |
| Temperature, °F | 175 to 480 | 275 |
| Materials Compositions: | | |
| Acid-olefin reaction product to Extractor— | | |
| Acid strength, hydrocarbon free basis, wt. percent $H_2SO_4$ | 60 to 70 | 63 |
| Total absorbed propylene, moles/mole 100% $H_2SO_4$ | 1 to 2 | 1.5 |
| Recycle Lean Acid— | | |
| Acid strength propylene free basis wt. percent $H_2SO_4$ | 62 to 72 | 65 |
| Absorbed propylene, moles propylene/mole 100% $H_2SO_4$ | 0.9 to 1.4 | 1.0 |
| Ether Extract— | | |
| Solvent, wt. percent | 80 to 95 | 93 |
| Ether, wt. percent | 3 to 15 | 6 |
| Alcohol, wt. percent | .1 to .5 | .3 |
| Propylene, wt. percent | .5 to 3 | .7 |
| Recycle Solvent— | | |
| Solvent, wt. percent | 98 to 99 | 99 |
| Ether, wt. percent | 0.1 to 0.5 | 0.2 |
| Alcohol, wt. percent | 0.1 to 0.5 | 0.3 |
| Products— | | |
| Ether moles/mole propylene converted | .80 to 0.95 | 0.9 |
| Alcohol moles/mole propylene converted | .05 to .1 | 0.07 |
| Propylene Conversion, Percent per pass | 17 to 30 | 27 |
| Selectivity per pass with alcohol recycle, moles ether/mole propylene converted | 90 to 94 | 92 |

While a number of solvents can be used, it has been found that superior results are obtained by using aromatic hydrocarbons, preferably single ring aromatics, such as alkyl substituted benzenes. For most efficient operation, a solvent having a boiling point higher than the hydration products, which does not form constant boiling mixtures with the hydration products and which is liquid at the operating temperatures is preferred. Broadly, however, any diisopropyl ether selective hydrocarbon solvent, inert under the conditions of reaction, may be used including compounds such as: aromatic hydrocarbons, e.g., benzene and alkyl substituted benzenes, and naphthalene and substituted naphthalenes; aliphatic hydrocarbons, e.g., n-decane and cetane—lower homologues, however, such as n-octane azeotrope with the hydration products and cause separation difficulties; naphthenic hydrocarbons, e.g., decalin and substituted cycloalkanes; halogenated aromatics, e.g., chlorotoluene, chlorobenzene and higher chlorinated aromatics; and ethers such as diphenyl and phenyl methyl ether.

The solvent may of course comprise mixtures of such hydrocarbons. For example, naphthas or kerosenes obtained by atmospheric distillation of crude oils in some cases make suitable solvents. Halogenated aromatics are very desirably used as additives in a solvent.

In the extraction zone, ether formation rate catalyst, either liquid or solid, may be used, such as alkyl-aryl sulfonic acids, fluorinated alkanoic acids, metal salts and copper naphthenate. Propylene absorption rate catalysts may also be used including such materials as silver and copper compounds. Surface-active agents, such as aryl alkyl sulfonates, either liquid or solid, may be used to promote overall mass transfer during the absorption extraction step.

*Example I*

Two volumes of mixed xylenes were admixed with 1 volume of an acid-propylene reaction product (comprising 1.48 moles propylene per mole $H_2SO_4$ and 63 weight percent $H_2SO_4$ on a hydrocarbon-free basis). The resulting mixture was heated at 100° C. at 29 p.s.i.g. for 3 hours with agitation at 15 minute intervals. 26 percent of the propylene in the acid-propylene reaction product was recovered as diisopropyl ether from the solvent extract phase. When soaking the above acid extract in the absence of solvent under equivalent conditions, only 11.8% of the propylene in the acid extract was recovered as diisopropyl ether. While this was a batch experiment, it does illustrate the selective effect of the solvent.

Example II

The following Table II illustrates the improved results obtained by the solvent process of this invention. An acid extract (acid strength of 67% on hydrocarbon free basis) containing 1.48 moles of propylene per mole of 100% $H_2SO_4$ was treated in a conventional manner by stripping with an inert gas to secure the data in the column labeled "Conventional." An equivalent acid extract was then treated with xylene in the ratios indicated, to obtain the data in columns 2 and 3. The data in Table II demonstate the higher yield and improved ether selectivity obtained by the present process, as compared to an extract stripping process heretofore considered the most favorable for commercial operation. It is to be noted that the use of this solvent eliminated propylene regeneration.

TABLE II

| Process | Conventional (Control) | Simultaneous Equilibration Extraction | |
|---|---|---|---|
| | 1 | 2 | 3 |
| Xylene/$H_2SO_4$ Extract, Vol. Ratio | 0 | 1/1 | 2/1 |
| Percent $C_3^=$ converted to Isopropyl Ether | 12 | 24 | 30 |
| Percent Ether on $C_3^=$ Feed in $H_2SO_4$ Phase | 12 | 3 | 4 |
| Percent Ether on $C_3^=$ Feed in Xylene Phase | | 21 | 26 |
| Propylene regeneration, Percent on $C_3^=$ Feed | 40 | none | none |

Example III

Table III shows the superior results obtained with several different types of solvents. The acid-olefin reaction product had 1.4 moles of propylene/mol of 100% $H_2SO_4$ and an acid strength of 65% $H_2SO_4$ on a hydrocarbon free basis. 1 volume of solvent/vol. of acid-olefin product was used at a temperature of 212° F. for a contact time of 2 hours to secure the data:

TABLE III

| Solvent | Ether Yield; Mol. Percent of Propylene Feed | |
|---|---|---|
| | In Solvent | Total |
| Xylenes | 18 | 23 |
| p-chlorotoluene | 16 | 24 |
| Decalin | 16 | 22 |
| Tetralin | 16 | 22 |
| Phenyl Methyl ether | 13 | 17 |
| Diphenyl ether | 11 | 20 |
| n-dodecane | <12 | |
| 3,3,5 trimethyl heptane | 14 | 19 |
| None | 0 | 12 |

As shown by Table III substituted benzenes, and more especially xylenes, are much preferred as solvents. Other single aromatic ring compounds work almost as well, however, and are next preferred. Of the other single aromatic ring compounds, halogenated substituted aromatics such as p-chlorotoluene are most preferred followed by aromatic-naphthenes such as decalin and tetralin.

Ether yields are influenced by the residence time of the solvent and acid-propylene product in the extractor zone. Maximum yields in a one stage operation are attained with 2-3 hours residence times at temperatures of 210- 230° F. Increasing residence times beyond 3 hours results in feed degradation by increased polymer formation and lower ether yields. Thus with a 4 hour residence time, a polymer yield of 8% was obtained at 212° F. as compared to only 3% for 3 hours. Ether yields were 18% at 4 hours and 22% at 3 hours.

An extraction temperature in the range of 195° F. to 230° F. has been found to be optimum. At higher temperatures, polymer formation is increased excessively and ether selectivity is decreased. Acid degradation and oxidation also occur at higher temperatures. For example, increasing the temperature from 230° F. to 250° F. in a series of experiments increased acid degradation fourfold. Moreover, operating at 250° F. with a xylene solvent, decreased the ether yield from 57 to 45%, and increased polymer yield from 2 to 5%. Aryl sulfonates were also formed which complicated purification of the ether. Lowering the temperature below 195° F. has been found to decrease the ether production rate markedly.

The ether production rate for a given residence time is influenced greatly by the solvent to sulfuric acid ratio. Selectivity to ether is also affected by the ratio because polymer yield increases with increasing solvent ratio: It is preferred to maintain this ratio in the range of 0.5/1 to 2/1 vols. solvent/vol. of $H_2SO_4$. Below this range, ether production rate is low, and above this range, ether selectivity decreases, although the process is operable outside of these ranges.

Experimental data have shown that although acid-propylene reaction products containing 60 wt. percent $H_2SO_4$ on a hydrocarbon free basis produce ether yields equivalent to ones containing 65-70 wt. percent $H_2SO_4$, absorption rates of propylene in acid strengths below 65 wt. percent decrease rapidly. It has also been found that the efficiency of the solvent in extracting ether from acid-propylene reaction products falls off rapidly when the concentration of acid exceeds 70 wt. percent $H_2SO_4$ on a hydrocarbon free basis.

It has also been found that while the acid-olefin reaction product may contain between 1 and 2 moles of propylene/mole of 100% $H_2SO_4$, above 1.6 moles of propylene the rate of propylene absorption falls off rapidly. An optimum propylene saturation has been found to be about 1.4 moles propylene/mole of 100% $H_2SO_4$ at an acid strength of 67 wt. percent $H_2SO_4$ and a propylene partial pressure of 145 p.s.i.a.

Having described this invention, what is sought to be protected by Letters Patent is succinctly set forth in the following claims.

What is claimed is:

1. In a process for the manufacture of diisopropyl ether wherein propylene is contacted with 60-70 wt. percent aqueous sulfuric acid to form an acid-propylene extract, the improvement which comprises promptly heat soaking at a temperature in the range of 160° to 230° F. the extract to form diisopropyl ether and simultaneously contacting the propylene extract in an extraction zone at said temperature with an ether-selective solvent selected from the group consisting of benzene and alkyl substituted benzenes, naphthalene hydrocarbons, aliphatic hydrocarbons of at least ten carbon atoms, naphthenic hydrocarbons, halogenated aromatics, and phenyl ethers, for a period of 30 to 200 minutes, then separating the ether-containing solvent extract from the resulting admixture leaving a lean acid, and separating diisopropyl ether and solvent from said solvent extract.

2. A process according to claim 1 wherein the pressure in said extraction zone is maintained in the range of 20 to 200 p.s.i.

3. In a continuous process for converting propylene into diisopropyl ether comprising contacting said propylene with 65 to 70 weight percent sulfuric acid to form an acid-propylene extract wherein said extract contains 1.0 to 2.0 moles absorbed propylene per mole of 100% sulfuric acid, the improvement which comprises admixing one volume of said extract with recycle alcohol in a mixing step, countercurrently contacting the resulting admixture in an extraction zone with 0.5 to 3.0 volumes of a single-ring aromatic hydrocarbon as an ether-selective solvent at a temperature in the range of 195° to 230° F., a pressure in the range of 20 to 200 p.s.i., and an acid extract holding time of 30 to 200 minutes and thereby providing sufficient heat soaking to convert the said acid extract into diisopropyl ether and propanol during the solvent extraction, withdrawing overhead from the extraction zone a solvent extract containing at least 3 weight percent ether, withdrawing lean acid from the lower portion of said extraction zone, separating said solvent extract to recover diisopropyl ether, propanol, and solvent, returning said propanol to said mixing step, and returning said solvent to said extraction zone to repeat the process.

4. A process according to claim 3 wherein make-up water is also added to the said mixing step in a sufficient amount to maintain the concentration of the sulfuric acid between 65 and 70 percent.

5. A process according to claim 3 wherein the ether-extractive solvent is xylene.

References Cited in the file of this patent

UNITED STATES PATENTS

| | | |
|---|---|---|
| 2,178,186 | Oldershaw | Oct. 31, 1939 |

FOREIGN PATENTS

| | | |
|---|---|---|
| 535,111 | Great Britain | Mar. 28, 1941 |